United States Patent
Peng

(10) Patent No.: US 10,474,012 B2
(45) Date of Patent: Nov. 12, 2019

(54) GIMBAL, GIMBAL ASSEMBLY AND UNMANNED AERIAL VEHICLE

(71) Applicant: AUTEL ROBOTICS CO., LTD., Shenzhen, Guangdong (CN)

(72) Inventor: Huai Peng, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/124,740

(22) Filed: Sep. 7, 2018

(65) Prior Publication Data

US 2018/0364548 A1  Dec. 20, 2018

Related U.S. Application Data

(63) Continuation-in-part of application No. PCT/CN2018/078602, filed on Mar. 9, 2018.

(30) Foreign Application Priority Data

May 2, 2017 (CN) .......................... 2017 2 0484994

(51) Int. Cl.
| | |
|---|---|
| *G03B 17/56* | (2006.01) |
| *G03B 15/00* | (2006.01) |
| *B64D 47/08* | (2006.01) |
| *B64C 39/02* | (2006.01) |

(52) U.S. Cl.
CPC .......... *G03B 17/561* (2013.01); *B64D 47/08* (2013.01); *G03B 15/006* (2013.01); *B64C 39/024* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 5,751,578 A | | 5/1998 | Quinn et al. |
| 5,752,088 A | * | 5/1998 | Desselle ............... B64D 47/08 348/144 |
| 2010/0079101 A1 | * | 4/2010 | Sidman ............... F16M 11/041 318/649 |
| 2018/0364548 A1 | * | 12/2018 | Peng ..................... G03B 17/561 |
| 2019/0118972 A1 | * | 4/2019 | Yan ........................ B64D 47/08 |

FOREIGN PATENT DOCUMENTS

| | | |
|---|---|---|
| CN | 204150234 U | 2/2015 |
| CN | 204279974 U | 4/2015 |
| CN | 204347416 U | 5/2015 |
| CN | 204587324 U | 8/2015 |
| CN | 205044999 U | 2/2016 |
| CN | 206813337 U | 12/2017 |
| KR | 20150054216 A | 5/2015 |

OTHER PUBLICATIONS

International Search Report dated Jun. 15, 2018; PCT/CN2018/078602.

* cited by examiner

*Primary Examiner* — William B Perkey

(57) ABSTRACT

The present invention provides a gimbal, a gimbal assembly and an unmanned aerial vehicle. The gimbal includes a mounting frame used for mounting a photographic device and a bind buckle used for fastening the photographic device. The bind buckle includes a main body and an adjustment structure. The main body is coupled to the mounting frame by using the adjustable structure, so that the bind buckle is capable of matching different types of photographic devices by adjusting the adjustable structure.

20 Claims, 3 Drawing Sheets

GIMBAL, GIMBAL ASSEMBLY AND UNMANNED AERIAL VEHICLE

CROSS REFERENCE

The present application is a continuation in part of International Application NO. PCT/CN2018/078602, filed on Mar. 9, 2018, which claims priority to Chinese Patent Application No. 201720484994.8, filed on May 2, 2017 and entitled "GIMBAL, GIMBAL ASSEMBLY AND UNMANNED AERIAL VEHICLE", both of which are incorporated herein by reference in their entireties.

TECHNICAL FIELD

The present invention relates to the field of gimbal technologies, and specifically, to a gimbal, a gimbal assembly and an unmanned aerial vehicle.

RELATED ART

As a stabilizer of a camera, a gimbal has a function of balancing and stabilizing the camera mounted on the gimbal. The camera is specifically mounted on a camera frame in the gimbal, and the camera assembled on the camera frame is fastened by using a camera buckle to prevent the camera from loosening or separating from the camera frame.

Currently, the camera is fastened by using the camera buckle of the gimbal in the following manners: One manner is that threaded mounting holes are provided on the top and the bottom of the camera frame, and correspondingly, two ends of the camera buckle are provided with threaded mounting holes. When fastening the camera after the camera is mounted, it is only need to bind the camera by using the camera buckle, aligning the threaded mounting holes at the two ends of the camera buckle to the threaded holes at the top and the bottom of the camera frame, and fasten the two ends of the camera buckle by driving screws. This manner requires a plurality of times of screwing. Consequently, operations are complex. The other manner is that one end of the camera buckle is hinged to the bottom of the camera frame and the other end is connected to the top of the camera frame in a manner of buckling connection. By means of this manner, operations are simplified. However, when the camera type is changed, or a manufacturing error exists in the camera buckle or the camera frame, a gap exists between the camera buckle and the camera. Consequently, the camera loosens.

SUMMARY

A main objective of the present invention is to provide a gimbal, a gimbal assembly and an unmanned aerial vehicle, to resolve a problem in the prior art that operations of mounting the camera are complex and the camera buckle in the prior art cannot match different types of camera.

To achieve the foregoing objective, the present invention provides a gimbal, including:

a mounting frame used for mounting a photographic device; and a bind buckle used for fastening the photographic device onto the mounting frame;

where the bind buckle comprises a main body and an adjustable structure, the main body being coupled to the mounting frame by using the adjustable structure, so that the bind buckle is capable of matching different types of photographic devices by adjusting the adjustable structure.

In an embodiment of the present invention, where the main body comprises a first end and a second end, the second end being hinged to the mounting frame, the first end being coupled to the mounting frame by using the adjustable structure.

In an embodiment of the present invention, where the main body comprises a first end and a second end, both the first end and the second end are coupled to the mounting frame by using the adjustable structure.

In an embodiment of the present invention, where the adjustable structure comprises:

a threaded adjustment member;

a threaded portion, provided at an end of the main body; and a limiting structure, disposed on the mounting frame and being provided with a receiving portion for receiving the end of the main body;

where the threaded adjustment member is connected to the threaded portion by screw threads, by adjusting the threaded adjustment member, a strength of a fastening force that the main body exerts on the photographic device is adjusted;

where the limiting structure is configured to, when the end of the main body being received in the receiving portion and the threaded adjustment member being connected to the threaded portion by the screw threads, prevent the bind buckle from detaching from the mounting frame.

In an embodiment of the present invention, where the threaded adjustment member is provided with a threaded hole having an internal thread;

where the threaded portion is an external thread provided on the end of the main body.

In an embodiment of the present invention, where the threaded adjustment member is provided with a protrusion, an outer surface of the protrusion being provided with an external thread;

where the threaded portion is a threaded hole having an internal thread, the threaded hole is provided in the end of the main body.

In an embodiment of the present invention, where the limiting structure is a limiting plate, the receiving portion is an open groove.

In an embodiment of the present invention, where the limiting structure comprises a first limiting portion having a first receiving portion and a second limiting portion having a second receiving portion, the second limiting portion being disposed on the mounting frame ;

where one end of the first limiting portion is hinged to one end of the second limiting portion and the other end of the first limiting portion is detachably connected to the other end of the second limiting portion, and the receiving portion is formed by the first receiving portion and the second receiving portion when the other end of the first limiting portion is detachably connected to the second limiting portion.

In an embodiment of the present invention, where the threaded adjustment member is a knob, a surface of the knob being provided with a knurl.

In an embodiment of the present invention, where the main body comprises a first buckle segment and a second buckle segment, the first buckle segment being hinged to the second buckle segment.

The present invention further provides a gimbal assembly, comprising a gimbal and a photographic device mounted on the gimbal, where the gimbal comprises:

a mounting frame used for mounting a photographic device; and a bind buckle used for fastening the photographic device onto the mounting frame;

where the bind buckle comprises a main body and an adjustable structure, the main body being coupled to the mounting frame by using the adjustable structure, so that the bind buckle is capable of matching different types of photographic devices by adjusting the adjustable structure.

In an embodiment of the present invention, where the main body comprises a first end and a second end, the second end being hinged to the mounting frame, the first end being coupled to the mounting frame by using the adjustable structure.

In an embodiment of the present invention, where the main body comprises a first end and a second end, both the first end and the second end are coupled to the mounting frame by using the adjustable structure.

In an embodiment of the present invention, where the adjustable structure comprises:

a threaded adjustment member;

a threaded portion, provided at an end of the main body; and a limiting structure, disposed on the mounting frame and being provided with a receiving portion for receiving the end of the main body;

where the threaded adjustment member is connected to the threaded portion by screw threads, by adjusting the threaded adjustment member, a strength of a fastening force that the main body exerts on the photographic device is adjusted;

where the limiting structure is configured to, when the end of the main body being received in the receiving portion and the threaded adjustment member being connected to the threaded portion by the screw threads, prevent the bind buckle from detaching from the mounting frame.

In an embodiment of the present invention, where the threaded adjustment member is provided with a threaded hole having an internal thread;

where the threaded portion is an external thread provided on the end of the main body.

In an embodiment of the present invention, where the threaded adjustment member is provided with a protrusion, an outer surface of the protrusion being provided with an external thread;

where the threaded portion is a threaded hole having an internal thread, the threaded hole is provided in the end of the main body.

In an embodiment of the present invention, where the limiting structure is a limiting plate, the receiving portion is an open groove.

In an embodiment of the present invention, where the limiting structure comprises a first limiting portion having a first receiving portion and a second limiting portion having a second receiving portion, the second limiting portion being disposed on the mounting frame ;

where one end of the first limiting portion is hinged to one end of the second limiting portion and the other end of the first limiting portion is detachably connected to the other end of the second limiting portion, and the receiving portion is formed by the first receiving portion and the second receiving portion when the other end of the first limiting portion is detachably connected to the second limiting portion.

In an embodiment of the present invention, where the threaded adjustment member is a knob, a surface of the knob being provided with a knurl.

In an embodiment of the present invention, where the main body comprises a first buckle segment and a second buckle segment, the first buckle segment being hinged to the second buckle segment.

The technical solutions of the present invention have the following advantages:

In the gimbal, the gimbal assembly and the unmanned aerial vehicle provided in the present invention. The gimbal includes a mounting frame used for mounting a photographic device and a bind buckle used for fastening the photographic device onto the mounting frame. The bind buckle comprises a main body and an adjustable structure. The main body is coupled to the mounting frame by using the adjustable structure. The bind buckle is capable of matching different types of photographic devices by adjusting the adjustable structure.

BRIEF DESCRIPTION OF THE DRAWINGS

To describe the technical solutions in the specific implementations of the present invention or in the prior art more clearly, the following briefly describes the accompanying drawings required for describing the specific implementations or the prior art. Apparently, the accompanying drawings in the following description show merely some embodiments of the present invention, and a person of ordinary skill in the art may still derive other drawings from these accompanying drawings without creative efforts. In the figures.

DETAILED DESCRIPTION

The following clearly describes the technical solutions of the present invention with reference to the accompanying drawings. Apparently, the described embodiments are some but not all of the embodiments of the present invention. All other embodiments obtained by a person of ordinary skill in the art based on the embodiments of the present invention without creative efforts shall fall within the protection scope of the present invention.

In the descriptions of the present invention, it should be noted that orientations or location relationships indicated by the terms "center", "up", "down", "left", "right", "vertical", "horizontal", "inside" and "outside" are orientations or location relationships indicated based on the accompanying drawings, and are merely used for ease of describing the present invention and for ease of simplifying descriptions, rather than for indicating or implying that the indicated apparatus or component needs to have a particular orientation or needs to be constructed or operated in a particular orientation, and therefore, cannot be construed as a limitation to the present invention. In addition, the terms "first", "second", and "third" are merely used for purposes of descriptions and are not intended to indicate or imply relative importance.

Figure 1:
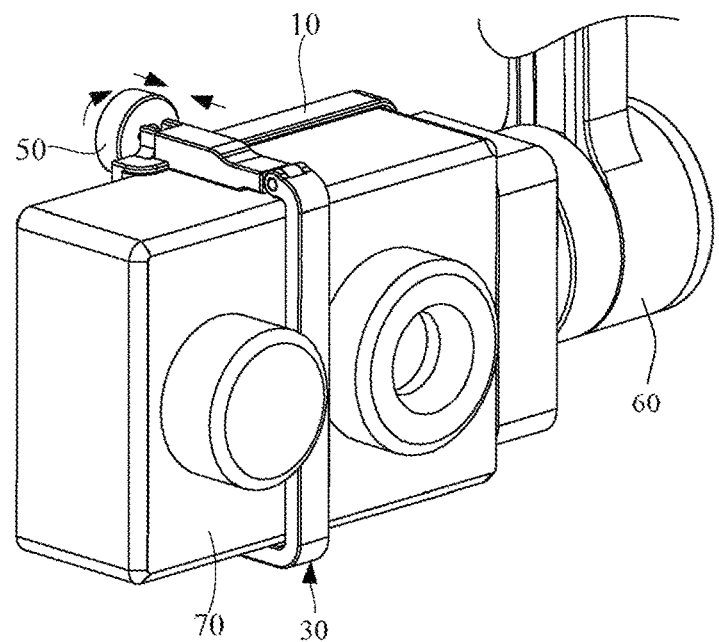
FIG. 1 is a schematic structural diagram of a gimbal assembly according to an embodiment of the present invention.

Referring to FIG. 1, the present invention provides a gimbal assembly including a gimbal 60 and a photographic device 70. The gimbal assembly can be applied on an unmanned aerial vehicle. The unmanned aerial vehicle may include a vehicle body, an arm coupled to the vehicle body and an actuating apparatus disposed on the arm. The gimbal assembly is connected to the vehicle body.

Figure 2:
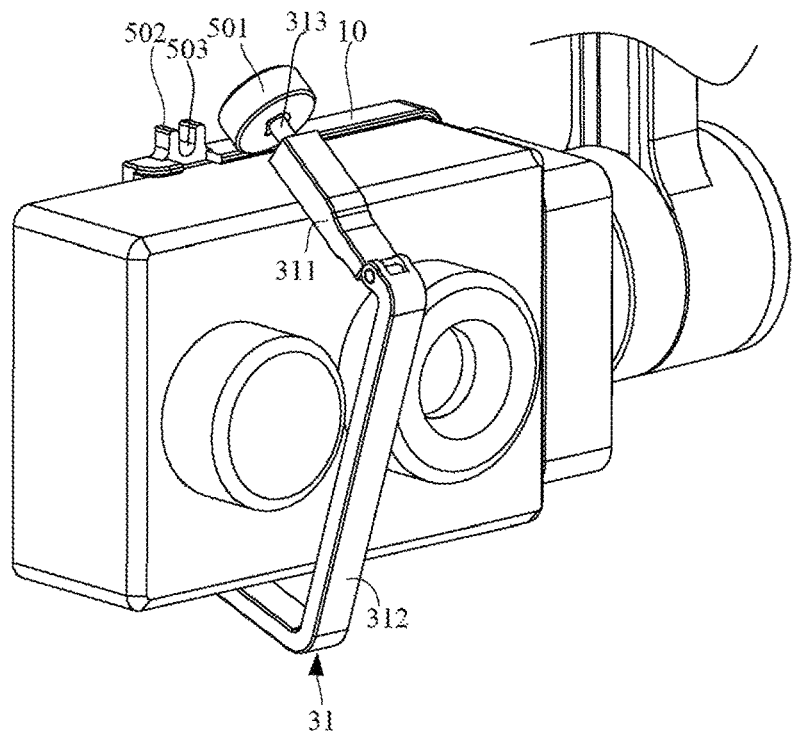
FIG. 2 is a schematic structural diagram of the gimbal assembly shown in FIG. 1, where a bind buckle is detached from a mounting frame.
Figure 3:
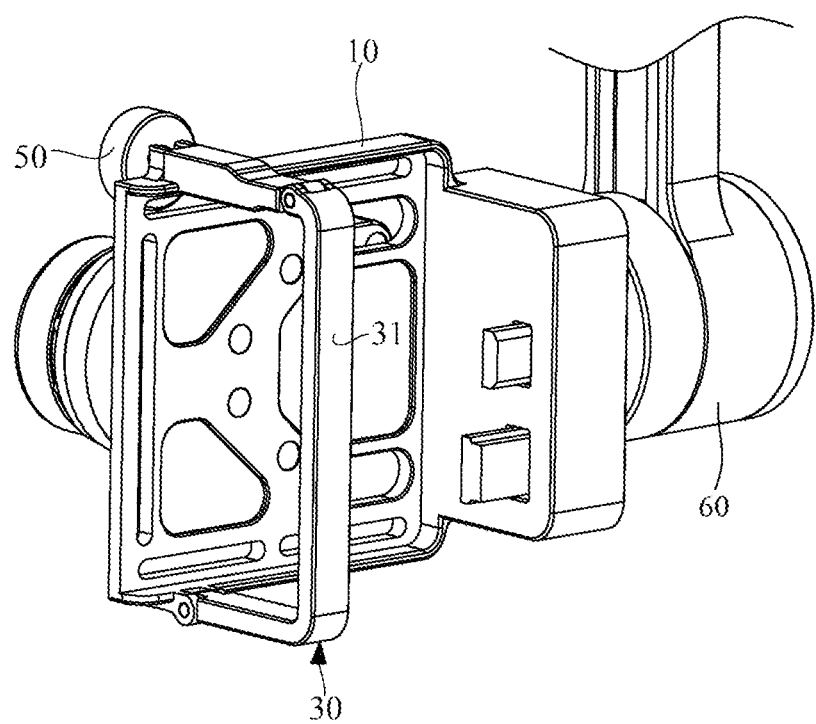
FIG. 3 is a schematic structural diagram of a gimbal according to an embodiment of the present invention.

Referring to FIG. 1 to FIG. 3, the gimbal 60 includes a mounting frame 10 used for mounting the photographic device 70 and a bind buckle 30 used for fastening the photographic device 70 onto the mounting frame 10. The bind buckle 30 includes a main body 31 and an adjustment structure 50. The main body 31 is coupled to the mounting frame 10 by using the adjustment structure 50 so that the bind buckle 30 is capable of matching different types of photographic devices by adjusting the adjustable structure 50.

In an embodiment of the present invention, the main body 31 includes a first buckle segment 311 and a second buckle segment 312 hinged to the first buckle segment 311. Specifically, one end of the first buckle segment 311 is coupled to the mounting frame 10 by using the adjustment structure 50 and the other end of the first buckle segment 311 is hinged to the second buckle segment 312. One end of the second buckle segment 312 is hinged to the first buckle segment 311 and the other end of the second buckle segment 312 is hinged to the mounting frame 10. The second buckle segment 312 is hinged to the first buckle segment 311, so that the structure of the bind buckle 30 may be simplified and the shape of the bind buckle 30 fits the outline of the photographic device 70, thereby avoiding interference between bind buckle 30 and the photographic device 70 when the bind buckle 30 is rotated to be open. In other possible embodiment, the other end of the second buckle segment 312 may also be coupled to the mounting frame 10 by using the adjustment structure 50. When a user mounts the photographic device 70, after disposing the photographic device 70 on the mounting frame 10, the user may make the bind buckle 30 fit the photographic device 70 by adjusting the adjustable structure 50. Therefore, a relatively good fastening effect is obtained and the photographic device 70 is prevented from loosening, thereby ensuring a photographic effect. In addition, when the user fastens the photographic device 70, because the other end of the second buckle segment 312 is hinged to the mounting frame 10, the user only needs to adjust the adjustable structure 50 to achieve the fastening effect of the photographic device 70. It is easier to operate.

In other possible embodiment of the present invention, the main body 31 may be a whole piece and may include a first end (not shown) and a second end (not shown). The first end is coupled to the mounting frame 10 by using the adjustment structure 50 and the second end is hinged to the mounting frame 10. Or, the first end and the second end is both coupled to the mounting frame 10 by using the adjustment structure 50.

Referring to FIG. 2 and FIG. 3, the adjustment structure 50 in an embodiment of the present invention comprises a threaded adjustment member 501, a threaded portion (not shown) provided at an end of the main body 31 and a limiting structure 502 disposed on the mounting frame 10. In this embodiment, the threaded portion is provided at an end 313 of the first buckle segment 311. The limiting structure 502 is provided with a receiving portion 503 for receiving the end 313 of the first buckle segment 311. The threaded adjustment member 501 is connected to the threaded portion by screw threads. By adjusting the threaded adjustment member 501, a strength of a fastening force that the main body 31 exerts on the photographic device 70 is adjusted. The bind buckle 30 is capable of matching different types of photographic devices by screwing the threaded adjustment member 501.

In an embodiment of the present invention, the threaded adjustment member 501 is a knob, a surface of the knob being provided with a knurl, thereby improving operability and comfort of adjustment of the user. The threaded adjustment member 501 is provided with a threaded hole having an internal thread. Correspondingly, the threaded portion is an external thread provided on the end 313 of the first buckle segment 311. In other possible embodiment, the threaded adjustment member 501 may be provided with a protrusion (not shown), an outer surface of the protrusion being provided with an external thread. Correspondingly, the threaded portion is a threaded hole having an internal thread and the threaded hole is provided in the end 313 of the first buckle segment 311.

In an embodiment of the present invention, the limiting structure 502 is a limiting plate. The receiving portion 503 is an open groove, so that when the photographic device 70 is disassembled, the bind buckle 30 and the threaded adjustment member 501 may be taken out from a rabbet of the open groove along a vertical direction without screwing the threaded adjustment member 501 out from the threaded portion completely, thereby simplifying the disassembling operation of the user while achieving the fastening effect. In some embodiment of the present invention, the open groove 503 is a U-shaped groove. When the end 313 of the first buckle segment 311 is received in the open groove 503 and the threaded adjustment member 501 is connected to the end 313 of the first buckle segment 311, the threaded adjustment member 501 is blocked by the limiting structure 502 because of the greater size of the thread adjustment member 501 than that of the open groove, so that prevents the bink buckle 30 from detaching from the mounting frame 10.

Figure 4:
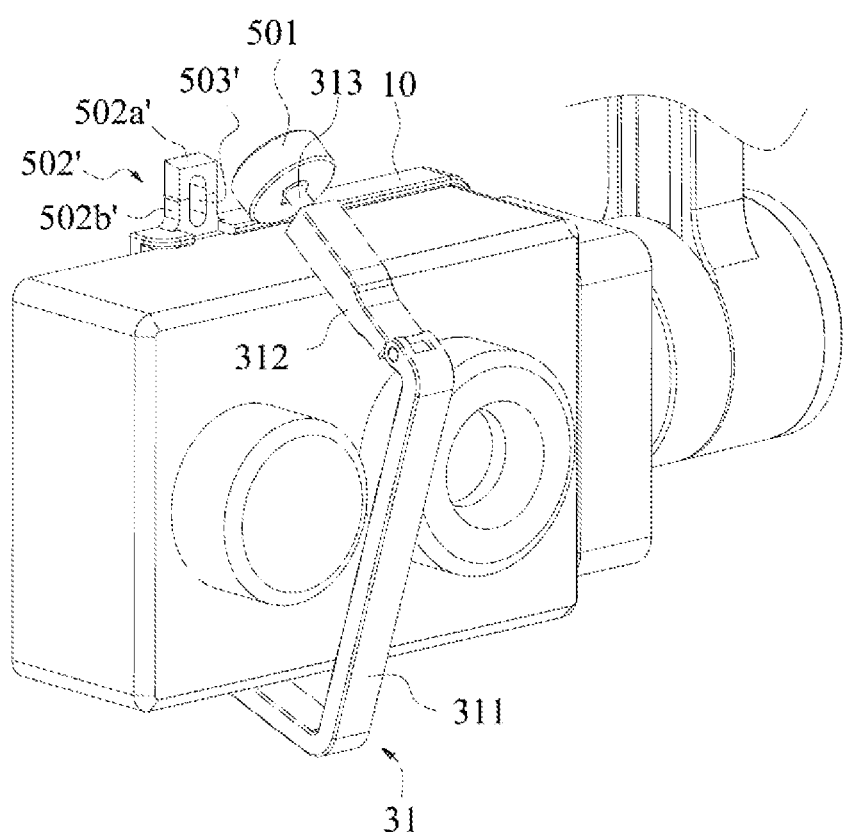
FIG. 4 is a schematic structural diagram of a gimbal assembly according to another embodiment of the present invention, where a bind buckle is detached from a mounting frame.

Referring to FIG. 4, in other possible embodiment of the present invention, the limiting structure 502' may comprise a first limiting portion 502a' having a first receiving portion (not shown) and a second limiting portion 502b' having a second receiving portion (not shown). The second limiting portion 502b' is disposed on the mounting frame 10. One end of the first limiting portion 502a' is hinged to one end of the second limiting portion 502b' and the other end of the first limiting portion 502a' is detachably connected to the other end of the second limiting portion 502b'. The receiving portion 503' is formed by the first receiving portion together with the second receiving portion when the other end of the first limiting portion 502a' is detachably connected to the other end of the second limiting portion 502b'. In this embodiment, the first receiving portion and the second receiving portion are both open groove. When the end 313 of the first buckle segment 311 is received in the receiving portion 503' and the threaded adjustment member 501 is connected to the end 313, the whole bind buckle 30 cannot be disassembled from the mounting frame 10 even along a vertical direction. This type of structure further makes sure that the photographic device 70 won't be loosen during the gimbal is moving. When the photographic device 70 needs to be disassembled from the mounting frame 10, the user only needs to detach the other end of the first limiting portion 502a' from the other end of the second limiting portion 502b' and take the end 313 and threaded adjustment member 501 out of the second receiving portion.

Obviously, the foregoing embodiments are merely examples for clear description, but are not intended to limit the implementations. A person of ordinary skill in the art may further make modifications and variations in other different forms based on the foregoing descriptions. Herein, there is no need to exhaust all implementations. Obvious changes or modifications derived from the foregoing descriptions still fall within the protection scope of the present invention.

What is claimed is:

1. A gimbal, comprising:
   a mounting frame used for mounting a photographic device; and
   a bind buckle used for fastening the photographic device onto the mounting frame;
   wherein the bind buckle comprises a main body and an adjustable structure, the main body being coupled to the mounting frame by using the adjustable structure, so that the bind buckle is capable of matching different types of photographic devices by adjusting the adjustable structure.

2. The gimbal according to claim 1, wherein the main body comprises a first end and a second end, the second end being hinged to the mounting frame, the first end being coupled to the mounting frame by using the adjustable structure.

3. The gimbal according to claim 1, wherein the main body comprises a first end and a second end, both the first end and the second end are coupled to the mounting frame by using the adjustable structure.

4. The gimbal according to claim 1, wherein the adjustable structure comprises:
   a threaded adjustment member;
   a threaded portion, provided at an end of the main body; and
   a limiting structure, disposed on the mounting frame and being provided with a receiving portion for receiving the end of the main body;
   wherein the threaded adjustment member is connected to the threaded portion by screw threads, by adjusting the threaded adjustment member, a strength of a fastening force that the main body exerts on the photographic device is adjusted;
   wherein the limiting structure is configured to, when the end of the main body being received in the receiving portion and the threaded adjustment member being connected to the threaded portion by the screw threads, prevent the bind buckle from detaching from the mounting frame.

5. The gimbal according to claim 4, wherein the threaded adjustment member is provided with a threaded hole having an internal thread;
   wherein the threaded portion is an external thread provided on the end of the main body.

6. The gimbal according to claim 4, wherein the threaded adjustment member is provided with a protrusion, an outer surface of the protrusion being provided with an external thread;
   wherein the threaded portion is a threaded hole having an internal thread, the threaded hole is provided in the end of the main body.

7. The gimbal according to claim 4, wherein the limiting structure is a limiting plate, the receiving portion is an open groove.

8. The gimbal according to claim 4, wherein the limiting structure comprises a first limiting portion having a first receiving portion and a second limiting portion having a second receiving portion, the second limiting portion being disposed on the mounting frame ;
   wherein one end of the first limiting portion is hinged to one end of the second limiting portion and the other end of the first limiting portion is detachably connected to the other end of the second limiting portion, and the receiving portion is fainted by the first receiving portion and the second receiving portion when the other end of the first limiting portion is detachably connected to the second limiting portion.

9. The gimbal according to claim 4, wherein the threaded adjustment member is a knob, a surface of the knob being provided with a knurl.

10. The gimbal according to claim 1, wherein the main body comprises a first buckle segment and a second buckle segment, the first buckle segment being hinged to the second buckle segment.

11. A gimbal assembly, comprising a gimbal and a photographic device mounted on the gimbal, wherein the gimbal comprises:
    a mounting frame used for mounting a photographic device; and
    a bind buckle used for fastening the photographic device onto the mounting frame;
    wherein the bind buckle comprises a main body and an adjustable structure, the main body being coupled to the mounting frame by using the adjustable structure, so that the bind buckle is capable of matching different types of photographic devices by adjusting the adjustable structure.

12. The gimbal according to claim 11, wherein the main body comprises a first end and a second end, the second end being hinged to the mounting frame, the first end being coupled to the mounting frame by using the adjustable structure.

13. The gimbal according to claim 11, wherein the main body comprises a first end and a second end, both the first end and the second end are coupled to the mounting frame by using the adjustable structure.

14. The gimbal according to claim 11, wherein the adjustable structure comprises:
    a threaded adjustment member;
    a threaded portion, provided at an end of the main body; and
    a limiting structure, disposed on the mounting frame and being provided with a receiving portion for receiving the end of the main body;
    wherein the threaded adjustment member is connected to the threaded portion by screw threads, by adjusting the threaded adjustment member, a strength of a fastening force that the main body exerts on the photographic device is adjusted;
    wherein the limiting structure is configured to, when the end of the main body being received in the receiving portion and the threaded adjustment member being connected to the threaded portion by the screw threads, prevent the bind buckle from detaching from the mounting frame.

15. The gimbal according to claim 14, wherein the threaded adjustment member is provided with a threaded hole having an internal thread;
    wherein the threaded portion is an external thread provided on the end of the main body.

16. The gimbal according to claim 14, wherein the threaded adjustment member is provided with a protrusion, an outer surface of the protrusion being provided with an external thread;

wherein the threaded portion is a threaded hole having an internal thread, the threaded hole is provided in the end of the main body.

17. The gimbal according to claim 14, wherein the limiting structure is a limiting plate, the receiving portion is an open groove.

18. The gimbal according to claim 14, wherein the limiting structure comprises a first limiting portion having a first receiving portion and a second limiting portion having a second receiving portion, the second limiting portion being disposed on the mounting frame ;

wherein one end of the first limiting portion is hinged to one end of the second limiting portion and the other end of the first limiting portion is detachably connected to the other end of the second limiting portion, and the receiving portion is formed by the first receiving portion and the second receiving portion when the other end of the first limiting portion is detachably connected to the second limiting portion.

19. The gimbal according to claim 14, wherein the threaded adjustment member is a knob, a surface of the knob being provided with a knurl.

20. The gimbal according to claim 11, wherein the main body comprises a first buckle segment and a second buckle segment, the first buckle segment being hinged to the second buckle segment.

* * * * *